(12) United States Patent
Blandy et al.

(10) Patent No.: US 6,604,167 B1
(45) Date of Patent: Aug. 5, 2003

(54) METHOD AND APPARATUS TRAVERSING STACKS FOR JUST-IN-TIME COMPILERS FOR JAVA VIRTUAL MACHINES

(75) Inventors: Geoffrey Owen Blandy, Austin, TX (US); Andrew Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 09/671,867

(22) Filed: Sep. 28, 2000

(51) Int. Cl.[7] .............................. G06F 12/00
(52) U.S. Cl. .................. 711/100; 711/221; 717/148; 717/162
(58) Field of Search ................. 717/148, 162; 711/100, 221; 707/101, 102

(56) References Cited

U.S. PATENT DOCUMENTS

| | | | |
|---|---|---|---|
| 6,324,687 B1 | * 11/2001 | Beadle et al. | 717/148 |
| 6,481,006 B1 | * 11/2002 | Blandy et al. | 717/139 |
| 2002/0066087 A1 | * 5/2002 | Long et al. | 717/148 |

* cited by examiner

*Primary Examiner*—Hiep T. Nguyen
(74) *Attorney, Agent, or Firm*—Duke W. Yee; Volel Emile

(57) ABSTRACT

A method and apparatus in a data processing system for traversing a plurality of frames for a stack stored sequentially in a memory. A method block associated with a current frame is found. The method block is read to identify an offset to previous frame information in the current frame. A previous frame is located within the plurality of frames using the previous frame information.

25 Claims, 4 Drawing Sheets

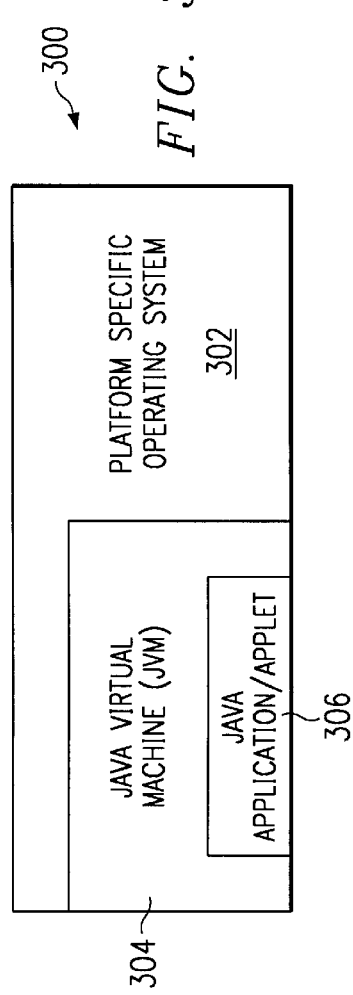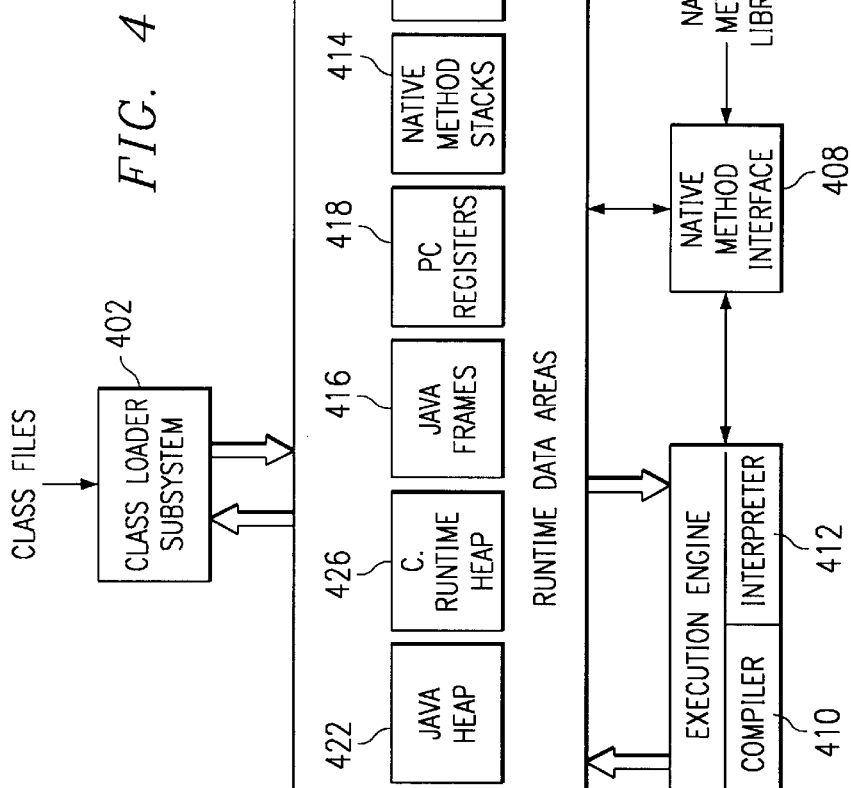

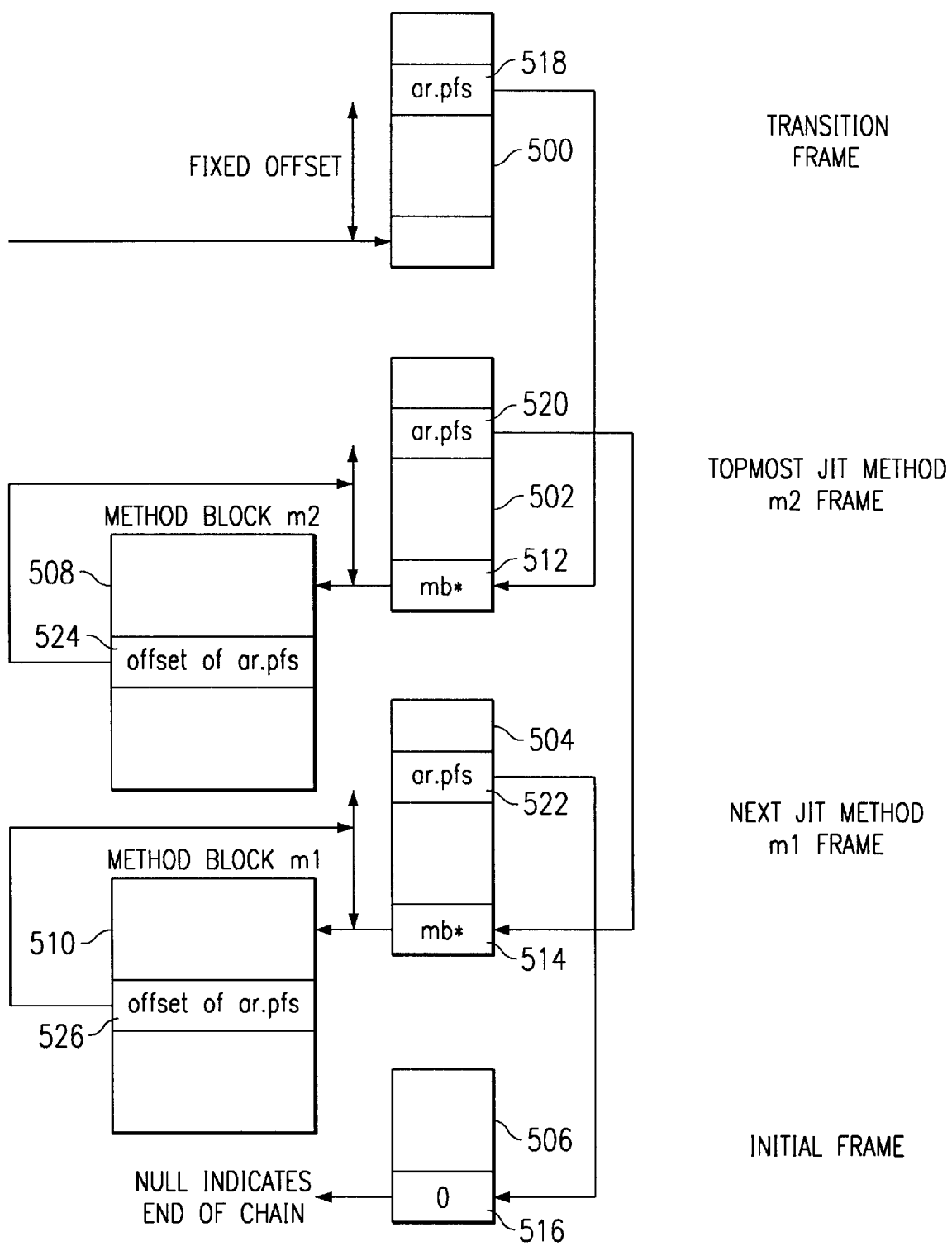

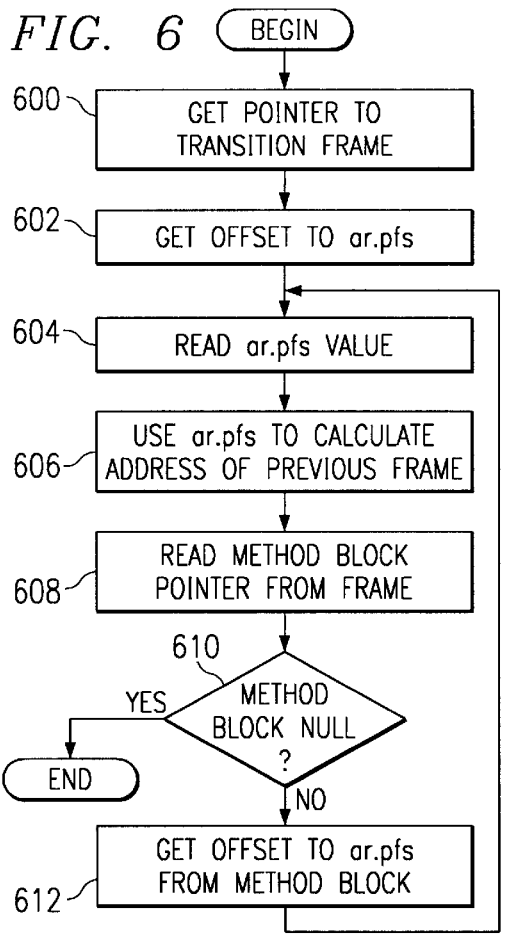
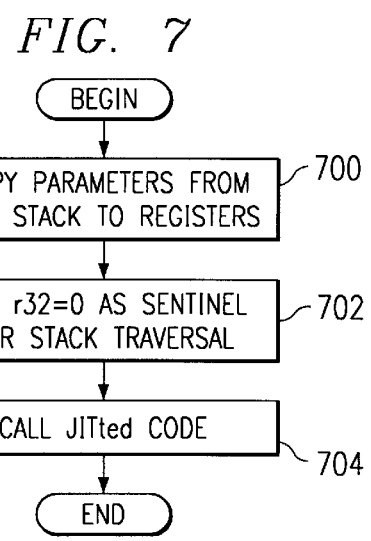
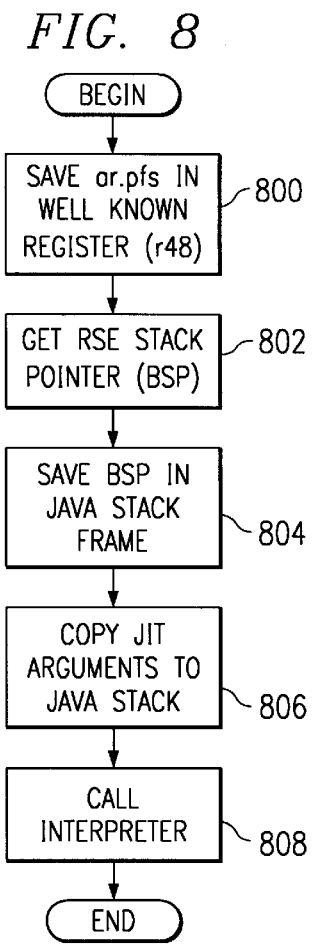

METHOD AND APPARATUS TRAVERSING STACKS FOR JUST-IN-TIME COMPILERS FOR JAVA VIRTUAL MACHINES

BACKGROUND OF THE INVENTION

1. Technical Field

The present invention relates generally to an improved data processing system and in particular, to a method and apparatus for processing data. Still more particularly, the present invention provides a method and apparatus for traversing frames in a stack.

2. Description of Related Art

Java is an object oriented programming language and environment focusing on defining data as objects and the methods that may be applied to those objects. "Java" is a trademark of Sun Microsystems, Inc. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software to different computing platforms.

Java is able to support applications for many types of data processing systems, which may contain a variety of central processing units and operating system architectures. The Java Virtual Machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java runtime system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM. When extra speed in executing a Java program is needed, a Just In Time (JIT) compiler may be used to translate bytecodes for a method or class into native machine instructions before executing them. This can occur as late as when a method is first executed.

JVMs are required to have a backtrace facility. This facility is used in application debugging as an exception to show a backtrace of routines. Further this backtrace facility also is used for certain security aspects in which the caller of a routine needs to be identified or a stack depth needs to be determined. Currently, maintaining sufficient information to allow creation of a back trace requires building a stack frame on every entry to a method. This step may take time and affect performance.

Therefore, it would be advantageous to have an improved method and apparatus for traversing frames in a stack.

SUMMARY OF THE INVENTION

The present invention provides a method and apparatus in a data processing system for traversing a plurality of frames for a stack stored sequentially in a memory. A method block associated with a current frame is found. The method block is read to identify an offset to previous frame information in the current frame. A previous frame is located within the plurality of frames using the previous frame information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrates the relationship of software components operating within a computer system that may implement the present invention;

FIG. 4 is a block diagram of a JVM in accordance with a preferred embodiment of the present invention;

FIG. 5 is a block diagram illustrating data structures used in traversing frames in accordance with a preferred embodiment of the present invention;

FIG. 6 is a flowchart of a process used for traversing frames from a stack in accordance with a preferred embodiment of the present invention;

FIG. 7 is a flowchart of a process used for transitioning from a Java interpreter into a JIT method in accordance with a preferred embodiment of the present invention;

FIG. 8 is a flowchart of a process used for transitioning from a JIT method to a Java interpreter in accordance with a preferred embodiment of the present invention; and FIG. 9 is code illustrating a JIT compiled version of a method in accordance with a preferred embodiment of the present invention.

DETAILED DESCRIPTION OF THE PREFERRED EMBODIMENT

Figure 1:
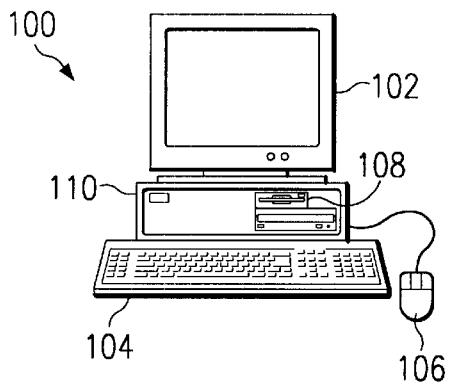
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
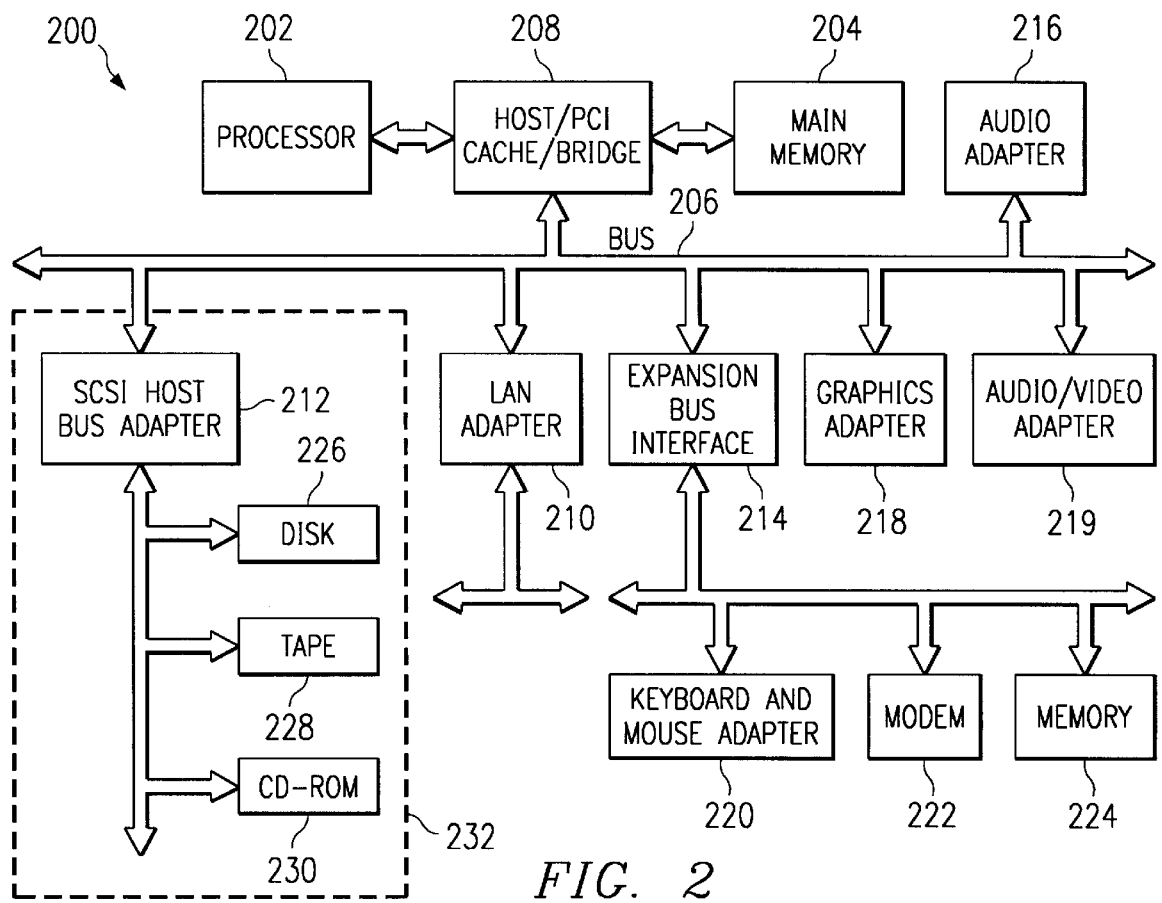
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

In these examples, the mechanisms of the present invention are implemented in a data processing system, such as data processing system 200 in which an Intel IA-64 architecture processor is present. In this architecture, registers are rotated so that the output registers become the input registers of the called routine. The mechanism of the present invention takes advantage of the fact that registers from a previous frame are inaccessible, but can be spilled into memory use a "flushrs" instruction in the IA-64 architecture. More information in the IA-64 architecture may be found in *Intel IA-64 Architecture Software Developer's Manual, Volume* 1: *IA-64 Application Architecture, Revision* 1.1, July 2000.

With reference now to FIG. 3, a block diagram illustrates the relationship of software components operating within a computer system that may implement the present invention. Java-based system 300 contains platform specific operating system 302 that provides hardware and system support to software executing on a specific hardware platform. Java Virtual Machine (JVM) 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 in FIG. 2 or computer 100 in FIG. 1 described above. However, JVM 304 may be implemented in dedicated hardware on a so-called Java chip, Java-on-silicon, or Java processor. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a Just-In-Time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs may interpret bytecodes or use other techniques, such as Just-In-Time compiling, to execute bytecodes. It is not uncommon for a JVM to interpret some methods and Just-In-Time compile others.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

With reference now to FIG. 4, a block diagram of a JVM is depicted in accordance with a preferred embodiment of the present invention. The mechanism of the present invention may be implemented within JVM 400 to traverse frames in a stack. JVM 400 includes a class loader subsystem 402, which is a mechanism for loading types, such as classes and interfaces, given fully qualified names. JVM 400 also contains runtime data areas 404, execution engine 406, native method interface 408, and memory management 428. Execution engine 406 is a mechanism for executing instructions contained in the methods of classes loaded by class loader subsystem 402. Execution engine 406 may be, for example, Java interpreter 412 or just-in-time compiler 410. Native method interface 408 allows access to resources in the underlying operating system. Native method interface 408 may be, for example, a Java native interface.

Runtime data areas 404 contain native method stacks 414, Java frames 416, PC registers 418, method area 420, heap 422, register stack engine (RSE) stacks 424, and C runtime heap 426. These different data areas represent the organization of memory needed by JVM 400 to execute a program. Each thread of execution has its own RSE stack.

With respect to the present invention RSE stack 424 contains frames from registers spilled into memory using a "flushrs" instruction in these examples. The location of the RSE stack is dependent on the operating system but typically would be adjacent to the the native method stack for that thread.

Java frames 416 are used to store the state of Java method invocations. When a new thread is launched, the JVM creates a new Java stack from which the thread will allocate Java Frames. A thread is a part of a program, i.e. a transaction or message, that can execute independently of other parts. In a multithreaded environment, multiple streams of execution may take place concurrently within the same program, each stream processing a different transaction or message.

A Java frame contains all the information pertaining to a single method invocation and is commonly partitioned into three regions. The first region holds all local variables including the input parameters. The second region is typically fixed in size and contains various pointers used by the interpreter including a pointer to the previous frame. The third region is the Java operand stack which is a FIFO stack that holds operands and results of bytecode operations. The operand stack is also used to pass parameters during invocation. The JVM performs only two operations directly on Java operand stacks: it pushes and pops stack items. These items may be object references or primitives such as integers or floating point values.

When the interpreter 412 invokes a Java method, the interpreter 412 saves the return PC, i.e. a bytecode pointer, in the current frame and makes an indirect call via a JVM invoker field in a method block of the Java method, as described in greater detail hereafter. Upon return from the JVM invoker, the interpreter fetches the current frame and resumes execution starting with the bytecode specified in the returnPC field. When an interpreted method completes, the current frame is discarded and the previous frame is made current.

Note that the JVM invoker field will point to different routines depending on the characteristics of the target method. For an interpreted method the JVM invoker routine allocates and initializes a Java frame and sets returnPC to the first bytecode of the called method. The new frame is made current and the JVM invoker returns to the interpreter to execute the method. For native and compiled code, the JVM invoker passes control to the called method and when a return is made to the interpreter the current frame is the same as when the call was made. By fetching the returnPC of the current frame, the interpreter resumes execution of the calling method. The JVM does not have any registers for holding intermediate values; any Java instruction that requires or produces an intermediate value uses the operand stack for holding the intermediate values. In this manner, the Java instruction set is well-defined for a variety of platform architectures.

PC registers 418 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 414 store the state of invocations of native methods. The state of native method invocations is stored in an implementation-dependent way in native method stacks, registers, or other implementation-dependent memory areas. In some JVM implementations, native method stacks 414 and Java frames 416 are combined.

Method area 420 contains class data while Java heap 422 contains all instantiated objects. The JVM specification strictly defines data types and operations. When JVM 400 loads a class file, it parses information about a type from the binary data contained in the class file. JVM 400 places this type information into the method area. Each time a class instance or array is created, the memory for the new object is allocated from heap 422. JVM 400 includes an instruction, which allocates memory space within the memory for heap 422, but includes no instruction for freeing that space within the memory.

Memory management 428 in the depicted example manages memory space within the memory allocated to heap 422. Memory management 428 may include a garbage collector which automatically reclaims memory used by objects that are no longer referenced. Additionally, a garbage collector also may move objects to reduce heap fragmentation.

The present invention is equally applicable to either a platform specific environment, i.e. a traditional computer application environment loading modules or native methods, or a platform independent environment, such as an interpretive environment, e.g., a Java environment loading classes, methods and the like.

The present invention provides a method, apparatus, and computer implemented instructions for traversing stack frames, such as those located in RSE stack 424 in FIG. 4.

In FIG. 5, a block diagram illustrating data structures used in traversing frames is depicted in accordance with a preferred embodiment of the present invention.

Frame 500, frame 502, frame 504, and a frame 506 are examples of frames from a register stack engine stack in an IA-64 architecture. Frame 500 is the transition frame, while frame 506 is the initial frame in this example. Frame 500, the transition frame indicates a transition to the JVM. A pointer to this topmost frame can be held in the Java stack frame.

Each of these frames contains information from registers that have been placed or spilled over into memory. In the depicted examples, these frames are located serially or sequentially in memory. The beginning of frames 512–506 in these examples holds a pointer or address to a method block associated with the method for the frame. Method block 508 and method block 510 are data structures that hold data and processes or routines for methods. Each method block is associated with a particular method.

Entry 512 points to method block 508 and entry 514 points to method block 510. Entry 516 in frame 506, however, contains a null value indicating that the initial frame has been reached and that no more frames are present. This null value indicates when the end of a traversal occurs. Alternatively, entry 516 may point to a dummy method block indicating no more JIT frames. Frame 506 is the initial frame in this example indicating the end of the chain of frames.

Further, each of the frames also contains information from a previous function state (PFS) register for a set of application registers. This value is referred to as ar.pfs in these examples. In the depicted examples, this information also includes the size of local variables in a previous frame. In this example, frame 502 is considered a previous frame to frame 500. Entries 518–522 contain the ar.pfs.

Offset information identifying the location of an entry containing an ar.pfs value is found in the method blocks. For example, field 524 within method block 528 contains an offset from entry 512, which is used to find entry 520 in frame 502. Method block 510 contains field 526, which holds the offset used to find the ar.pfs information in entry 522 in frame 504. The information in fields 524 and 526 are placed into method blocks 508 and 510 when the methods associated with these method blocks are compiled. These offsets are identified based on a selection of a particular register in the stacked general registers in an IA-64 process or architecture to hold the ar.pfs value for that method. As a result, the location of an ar.pfs value may change from frame to frame, as a different method could save the previous function state in a different stacked general register. In these examples, the ar.pfs value is placed into a register immediately after values for input parameters. This allows the field in the method block which holds the count of the number of parameters passed in registers to also be used to locate the ar.pfs value. For example, if registers r32 to r32 were used for parameters then register r39 would be used to store the ar.pfs value. Alternatively a separate field in the method block could be used to identify the register holding the ar.pfs value.

Using these data structures, the present invention provides a method, apparatus, and computer implemented instructions for traversing frames in which the calling convention for JIT compiled methods is made such that the first parameter (r32) is always an address for the method block associated with the method, as shown above with respect to frames 500–506. Alternatively, at the beginning of a method, the compiled code could load into a known stacked general register the address of the current method block. This must be done before a method call or subroutine call which could raise an exception or some other event requiring a frame traversal is called within that method. This would mean that the caller of a method would not have to pass the address of the method block value of the called routine.

In the depicted examples, the present invention is implemented using an Intel IA-64 architecture in which the registers are rotated so that the output registers of the caller routine become the input registers of the called routine. The registers from a previous frame are inaccessible but they can be spilled to memory using the 'flushrs' instruction.

Once the address is known of where the register holding the method block address has been spilled to then the previous frame can be found as follows:

1. Read method block value using the well known offset of it in the stack frame. If the method block is passed in register 32 (r32) then it will be at the beginning of the stack frame.

2. Identify from method block in which register ar.pfs ("application register previous function state") has been saved.

3. Calculate offset from start of frame where this register would have been stored.

4. Read this value from this offset in the stack frame.

5. Identify the size of the local variables in the previous frame from the ar.pfs value.

6. Step back to the start of the previous frame using the size value and the start of the current frame.

7. Read the method block at a well known location in the previous frame.

In these examples, the function being called in the Java virtual machine to traverse the frames is called once the thread has reentered execution of JVM code via a piece of linkage code. This linkage code stores the address of the JIT frame in the Java frame. The linkage code also may attempt to find the address of the frame of its caller and store that frame into the Java frame, but that imposes an overhead on every JIT to JVM call.

In the depicted examples, the address of the linkage code's frame is stored. The address of this linkage code's frame is found using ar.bsp "application register Register Stack Engine Backing Store Pointer". The register saving ar.pfs is then held at a well known offset. E.g., if the maximum number of parameters for any JIT to JVM call is 16, then ar.pfs could be stored in register 32+16=r48.

The stack traversal mechanism of the present invention then knows that the first JIT frame has ar.pfs held in r48, which can be found easily given the address of the start of the frame. Knowing that ar.pfs for the top JIT frame is in r48 means that steps 3–7 above can then be applied.

Turning next to FIG. 6, a flowchart of a process used for traversing frames from a stack is depicted in accordance with a preferred embodiment of the present invention.

The process begins by getting pointer to a transition frame (step 600). Next, the well known offset to ar.pfs in the transition frame is obtained (step 602). This value is used to identify the location of the ar.pfs in the frame. The value of ar.pfs is read (step 604). The ar.pfs in these examples, includes the size of the local variables in the previous frame to this frame. Then, ar.pfs is used to calculate the address of the previous frame (step 606). The address of the beginning of the previous frame is calculated using the address of the start of the current frame along with the size of the local variables for the previous frame. The method block pointer from the frame is read (step 608). At this stage, any additional processing of the frame and method block as required by the frame traversal can be made. For example, the name of the method could be obtained from the method block and printed out to give a back trace of the methods. A determination is then made as to whether the method block is null (step 610). If the method block is not null, the offset to ar.pfs is retrieved from the method block (step 612) with the process then returning to step 604.

With reference again to step 610, if the method block is null, the process terminates. A null value indicates that the initial frame at the end of the chain of frames has been reached. This means that the sequence of JIT frames has been traversed. If there are previous Java frames, then these can be traversed using a known idea of the frames being linked into a list. If one of the previous Java frames was created by a call from code, which had been JIT compiled, then that Java frame could contain a pointer to another transition frame and the process in FIG. 6 could be repeated.

Turning next to FIG. 7, a flowchart of a process used for transitioning from a Java interpreter into a JIT method is depicted in accordance with a preferred embodiment of the present invention.

The process begins by coping the parameters from the Java stack to registers (step 700). Next, the register normally used to pass a pointer to the method block (register 32, r32 in the preferred embodiment) is set to equal zero as sentinel for stack traversal (step 702). A sentinal is special value that could not possibly occur as regular input used to indicate the end of the chain. Register r32 normally holds a pointer to the method block. Then, the JITted code is called (step 704) with the process returning to the Java interpreter thereafter.

Turning next to FIG. 8, a flowchart of a process used for transitioning from a JIT method to a Java interpreter is depicted in accordance with a preferred embodiment of the present invention.

The process begins by saving ar.pfs in a well known register (step 800). In an IA-64 architecture this could be r48. Next, the RSE stack pointer (Backing Store Pointer, bsp) is retrieved (step 802). The bsp is saved in the Java stack frame (step 804). Then, the JIT arguments are copied to the Java stack (step 806). The interpreter is called (step 808) with the process returning to the JIT method thereafter.

Turning next to FIG. 9, code illustrating a JIT compiled version of a method is depicted in accordance with a preferred embodiment of the present invention. Code 900 illustrates the results of the compilation of an actual Java method. Line 902 illustrates compiled code in which information for ar.pfs is saved in register 35 (r35) in these examples. Of course, depending on the particular method and the number of variables, a different register may be used. The value in ar.pfs will be changed on a subroutine call because the call instruction (br.call) will save the value of the current function state into the previous function state register (ar.pfs). Line 904 is used to restore ar.pfs. so that when the return instruction (br.ret) is executed the processor can restore the value of the current function state of the previous frame from the value saved in ar.pfs.

Further, an additional feature may be included in the mechanism of the present invention to find the caller's return address in each JIT frame. Given a caller's instruction pointer and a table of instruction offset to source line numbers a back trace with source line numbers as well as methods can be constructed.

Thus, the present invention provides a method, apparatus, and computer implemented instructions for traversing frames containing information for methods. These frames are traversed using offset information obtained from the frames and within method blocks. In this manner, the mechanism of the present invention is not required to build a stack frame upon entry to every method and takes advantage of an ability to place register information into memory as registers are rotated from being output registers of a caller routine to input registers of a called routine.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for traversing a plurality of frames for a stack stored sequentially in a memory, the method comprising:
   finding a method block associated with a current frame;
   reading the method block to identify an offset to previous frame information in the current frame; and
   locating a previous frame within the plurality of frames using the previous frame information.

2. The method of claim 1 further comprising:
   repeating the finding, reading, and locating steps until all of the plurality of frames have been traversed.

3. The method of claim 1, wherein the method is implemented in just-in-time compiler for a Java virtual machine.

4. The method of claim 1, wherein the first pointer points to an address of the method block.

5. The method of claim 1, wherein the locating step comprises:
   determining an address for the previous frame using the previous frame information.

6. The method of claim 5, wherein the previous frame information is a size of local variables in the previous frame and wherein the wherein the previous frame information is located after the local variables in the subsequent frame.

7. The method of claim 1, wherein all of the plurality of frames are traversed when an address for the method block associated with the current frame is null.

8. The method of claim 1 further comprising:
   identifying a return address for a caller in each of the plurality of frames as they are located.

9. A method in a data processing system for traversing a plurality of frames stored sequentially in a memory, the method comprising:
   locating a current frame within the plurality of frames in the memory;
   obtaining an offset to frame offset information within the current frame;
   reading the frame offset information;
   determining an address for a previous frame using the frame offset information;
   finding a pointer to a method block associated with the previous frame using the address;
   determining whether a method block is present; and
   responsive to a method block being present, obtaining an offset to frame information in the previous frame.

10. A data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to find a method block associated with a current frame, read the method block to identify an offset to previous frame information in the current frame, and locate a previous frame within the plurality of frames using the previous frame information.

11. The data processing system of claim 10, wherein the bus system is a single bus.

12. The data processing system of claim 10, wherein the bus system includes a primary bus and a secondary bus.

13. The data processing system of claim 10, wherein the processing unit includes a plurality of processors.

14. The data processing system of claim 10, wherein the communications unit is one of a modem and Ethernet adapter.

15. A data processing system for traversing a plurality of frames for a stack stored sequentially in a memory, the data processing system comprising:
    finding means for finding a method block associated with a current frame;
    reading means for reading the method block to identify an offset to previous frame information in the current frame; and
    locating means for locating a previous frame within the plurality of frames using the previous frame information.

16. The data processing system of claim 15 further comprising:
    repeating means for repeatedly initiating the finding means, reading means, and locating means until all of the plurality of frames have been traversed.

17. The data processing system of claim 15, wherein the finding means, reading means, and locating means are implemented in just-in-time compiler for a Java virtual machine.

18. The data processing system of claim 15, wherein the first pointer points to an address of the method block.

19. The data processing system of claim 15, wherein the locating means comprises:
    determining means for determining an address for the previous frame using the previous frame information.

20. The data processing system of claim 19, wherein the previous frame information is a size of local variables in the previous frame and wherein the wherein the previous frame information is located after the local variables in the subsequent frame.

21. The data processing system of claim 15, wherein all of the plurality of frames are traversed when an address for the method block associated with the current frame is null.

22. The data processing system of claim 15 further comprising:
    identifying means for identifying a return address for a caller in each of the plurality of frames as they are located.

23. A data processing system for traversing a plurality of frames stored sequentially in a memory comprising:
    locating means for locating a current frame within the plurality of frames in the memory;
    obtaining means for obtaining an offset to frame offset information within the current frame;
    reading means for reading the frame offset information;
    determining means for determining an address for a previous frame using the frame offset information;
    finding means for finding a pointer to a method block associated with the previous frame using the address;
    determining means for determining whether a method block is present; and
    obtaining means, responsive to a method block being present, for obtaining an offset to frame information in the previous frame.

24. A computer program product in a computer readable medium for use in a data processing system for traversing a plurality of frames for a stack stored sequentially in a memory, the computer program product comprising:
    first instructions for finding a method block associated with a current frame;
    second instructions for reading the method block to identify an offset to previous frame information in the current frame; and third instructions for locating a previous frame within the plurality of frames using the previous frame information.

25. A computer program product in a computer readable medium for use in a data processing system for traversing a plurality of frames stored sequentially in a memory, the computer program product comprising:

first instructions for locating a current frame within the plurality of frames in the memory;

second instructions for obtaining an offset to frame offset information within the current frame;

third instructions for reading the frame offset information;

fourth instructions for determining an address for a previous frame using the frame offset information;

fifth instructions for finding a pointer to a method block associated with the previous frame using the address;

sixth instructions for determining whether a method block is present; and seventh instructions for, responsive to a method block being present, obtaining an offset to frame information in the previous frame.

* * * * *